G. H. MUELLER.
LUBRICATING DEVICE FOR CONVEYER CHAINS.
APPLICATION FILED DEC. 19, 1908. RENEWED MAY 31, 1911.
1,014,248.
Patented Jan. 9, 1912.
2 SHEETS—SHEET 2.
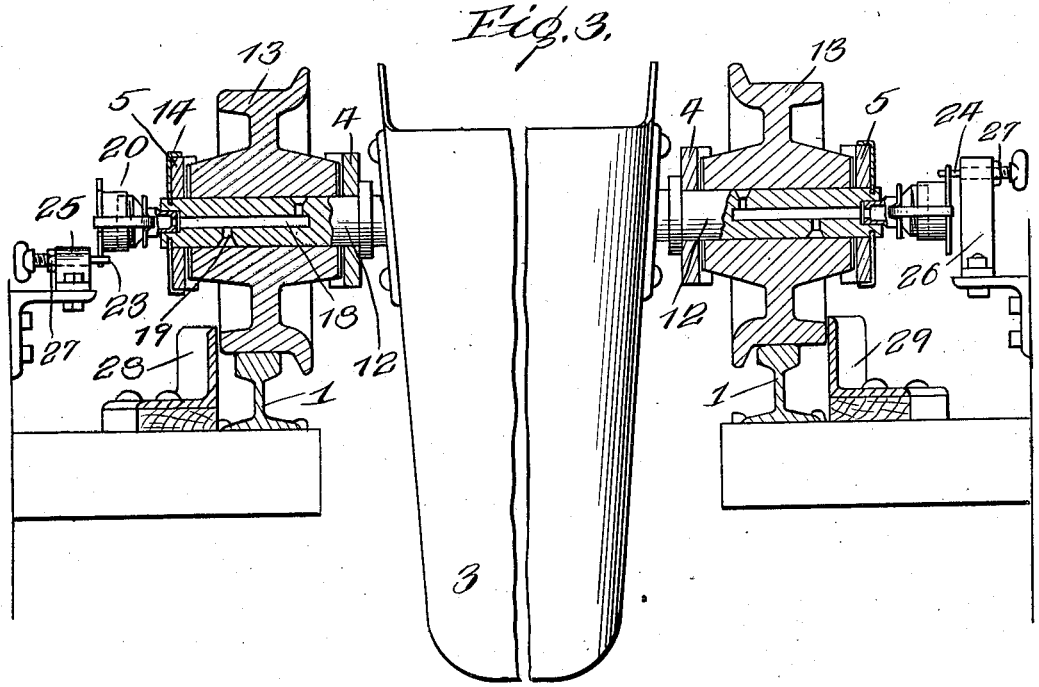
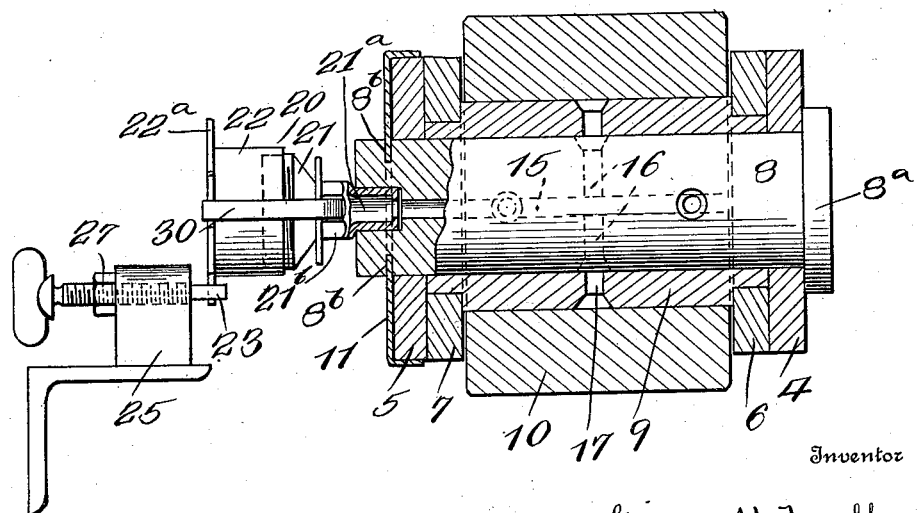
Witnesses
Inventor
George H. Mueller
By H. H. Bliss
Attorney

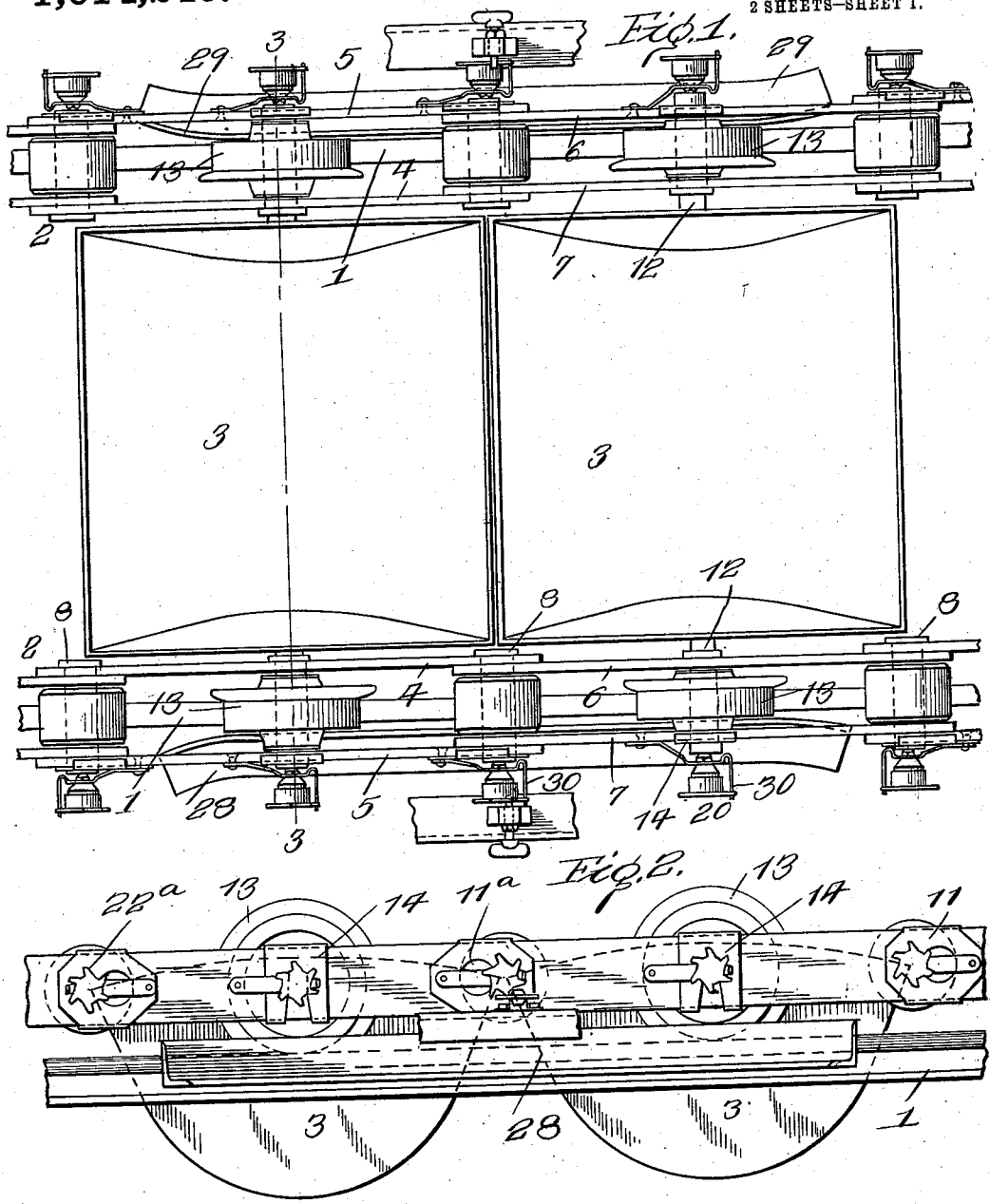

UNITED STATES PATENT OFFICE.

GEORGE HENRY MUELLER, OF COLUMBUS, OHIO, ASSIGNOR TO THE JEFFREY MANUFACTURING COMPANY, A CORPORATION OF OHIO.

LUBRICATING DEVICE FOR CONVEYER-CHAINS.

1,014,248. Specification of Letters Patent. Patented Jan. 9, 1912.

Application filed December 19, 1908, Serial No. 468,351. Renewed May 31, 1911. Serial No. 630,456.

*To all whom it may concern:*

Be it known that I, GEORGE H. MUELLER, a citizen of the United States, residing at Columbus, in the county of Franklin and State of Ohio, have invented certain new and useful Improvements in Lubricating Devices for Conveyer-Chains and the Like, of which the following is a specification, reference being had therein to the accompanying drawing.

This invention relates to devices for lubricating the bearing surfaces and joints of conveyer chains and various other mechanisms in which the parts to be lubricated are in their operation bodily movable.

The invention is especially useful in connection with conveyer chains, and in the following description and the accompanying drawings I shall set forth an application of the invention in connection with a conveyer of the swinging bucket type.

Much difficulty has been encountered in attempting to secure a thorough and satisfactory lubrication of mechanism of this sort. It has been found difficult to feed the lubricant to the bearing surfaces of the conveyer chains where it is needed. Devices have been proposed for dropping oil upon the chain joints as they pass the lubricating device; but such systems are not satisfactory because the oil fails to reach the bearing surfaces in any adequate amount, and as the greater part of the oil drops from the chain the system is very wasteful. A further objection to this or any other method of lubrication in which the lubricant is applied to the exterior of the chain parts, is that the lubricant becomes contaminated with dust and gritty substances, such as are commonly present in a greater or less degree in connection with all conveyers, but more particularly when gritty materials are being handled. The result is that such lubricant as does find its way to the bearing surfaces carries with it gritty substances which cause a rapid deterioration of the chain joints.

One of the objects of this invention is to provide lubricating devices for chains and the like adapted to positively force lubricant directly to the bearing surfaces and joints of the chain, and at the same time inclosing the lubricant so as to prevent its contamination with dust or gritty substances.

A further object of the invention is to provide lubricating devices by means of which viscous or semisolid lubricants can be fed positively and automatically to the bearing surfaces of chains, as well as other mechanisms in which the parts are bodily movable in operation.

Further objects of my invention, as well as the means which I employ to attain its various objects, will be understood from the following detailed description in connection with the accompanying drawings in which, Figure 1 is a plan view of a short section of a swinging bucket conveyer. Fig. 2 is a side elevation of the same. Fig. 3 is a transverse section on line 3—3 of Fig. 1, a portion of the bucket being broken away to permit a showing on an enlarged scale, and Fig. 4 is a transverse section on an enlarged scale through one of the chain pins and rollers.

Referring in detail to the construction shown, 1—1 are supporting and guiding rails upon which the conveyer runs. Said conveyer consists of two chains designated as entireties by 2—2 between which are swung pivoted buckets 3—3.

The conveyer chains 2 are substantially alike and a description of one will suffice for both. The alternate links consist of bars 4, 5, and 6, 7 respectively, and these links are pivotally connected by pins 8. A bearing sleeve 9 is mounted upon each of these pins, and on said sleeve is rotatably mounted in turn a roller 10 adapted to engage the guiding rails 1, more especially when the conveyer passes around a bend from one flight to another. The ends of the chain link bars 6 and 7 are mounted on the shouldered ends of sleeve 9, while the link bars 4 and 5 directly engage the pin 8. The inner end of the pin 8 is formed with a head $8^a$ and its outer end is formed with diametrically opposite slots $8^b$ designed to be engaged by the edges of a locking plate 11. This locking plate is formed with a circular aperture $11^a$ of a size to receive the end of the pin 8 and having a straight sided extension, the edges of which are adapted to enter the slots $8^b$ of the pin when the locking plate is moved longitudinally of the link bar.

From the middle of each of the chain links is swung one of the conveyer buckets 3, the trunnions 12—12 of the buckets being passed through the link bars 4, 5, or 6 and 7, as the case may be, and serving at the same time as axles for the flanged track wheels 13—13. Forked clips or locking plates 14 engage the slotted ends of the trunnions or axles 12 and secure the latter against endwise movement in relation to the chain. The end which my invention strives to attain is the lubrication of the bearing surface between the chain pins 8, sleeves 9, link bars and rollers 10 on the one hand, and the bearing surface between the axle 12 and track wheels 13 on the other hand. To this end an axial passage 15 and radial passages 16 extending therefrom to the outer surface of the pin are drilled in each of the pins 8, and passages 17 are drilled through the bearing sleeve 9. Similarly an axial passage 18 and radial passages 19 are drilled in the axles or trunnions 12. In the outer ends of the pin passages 15, and the axial passages 18 are screwed grease cups 20. Each of these cups comprises a base part 21 and a cap part 22, the latter being threaded upon the former, so that by the rotation of the cap parts grease or other lubricant inclosed in the cup may be forced through the discharge passage 21ª of the base part into the axial passage of the pin or axle.

In order to render the feed of the lubricant automatic the following devices are provided: The cap of each of the grease cups is formed with a series of teeth 22ª and at some convenient point in the path of the conveyer and at either side thereof are arranged pins 23, 24. These pins are preferably threaded into suitable rigid supports 25, 26 so that said pins may be adjusted toward and from the conveyer, and lock nuts 27 are provided to hold the pins in adjusted position. It is clear that as the conveyer advances, each grease cup in turn has one of its teeth 22ª come into engagement with the pin 23, or 24, as the case may be, thus turning the cap 22 a fraction of a revolution on its base part 21 which results in the positive feed of the lubricant into and through the passages of the chain pins and axles.

In order that a definite path may be maintained for the grease cups as they approach and pass the stationary pins 23, 24, guiding or centering rails 28, 29 are mounted just outside the rails 1. These centering rails have upstanding flanges which prevent a lateral movement of the conveyer as it passes the contact pins 23 and 24.

It is apparent that repeated actuations of the grease cup caps will result in the movement of the path of the cap teeth 22ª toward the ends of the stationary contact pins 23, 24. Therefore by properly setting the contact pins 23, 24 the number of actuations of the grease cup caps may be limited or determined as desired, for, after a certain number of actuations, the teeth of the cup caps will fail to engage the pins. Thus the screwing on of the caps too far may readily be prevented, and also it is possible to limit the positive feed of the lubricant to a given number of passes of the conveyer during which the lubricant passages are thoroughly filled and after which the lubricant may be allowed for a time to find its way to the various bearing surfaces without being subjected to the positive feed pressure.

It will be observed that the contact pin 23 is disposed so as to engage the grease cup caps on the lower side thereof, while the pin 24 on the other side of the conveyer is arranged to engage the caps on the upper side thereof. This is done to permit the use on both sides of the conveyer of uniform grease cups threaded in the same way.

Associated with each of the grease cups is a spring 30, which is riveted at one end to the adjacent link bar of the chain, is provided with a perforation to receive the angular shank 21ᵇ of the grease cup, and has its free end extending outwardly to engage the teeth 22ª of the cup. These springs serve both to prevent the threaded shanks of the grease cups from becoming loose and falling from the chain pins or axles and also to prevent the caps of the cups from unscrewing, due to the vibration of the machine or for any other cause. In this connection it will be noted that the teeth 22ª of the grease cups are shaped so that the spring prevents rotation of the cap in one direction but not in the other.

To put my invention into operation, the grease cups are first filled with a suitable lubricant, the stationary contact pins are adjusted so as to produce the desired advance of the grease cup caps on their base or shank parts, and the conveyer may then be started. On each complete circuit of the conveyer, each of the grease cup caps is actuated in the manner previously described, and the lubricant is forced under pressure through the passages in the chain pins and bearing sleeves to the various bearing surfaces. With this system of lubrication, the application of the lubricant directly to the bearing surfaces is absolutely assured, the contamination of the lubricant with dust and grit is entirely prevented, the waste of lubricant is avoided, and finally lubricant of low cost, such as grease, may be employed. The cost of the lubrication is therefore reduced to a minimum while, at the same time, practically perfect lubrication is secured.

I have referred to but one set of contact pins, 23, 24, but it is obvious that one or more additional pairs of pins might be provided as, for example, in the case of extremely long conveyer systems.

What I claim is,

1. In a conveyer or the like, the combination with a chain of positive feed lubricant cups carried by the chain to feed lubricant to the bearing surfaces thereof, and means for automatically actuating said lubricant cups.

2. In a conveyer or the like, the combination with a chain of positive feed lubricant cups carried by the chain to feed lubricant to the bearing surfaces thereof, and means operable through the movement of the conveyer for automatically actuating said lubricant cups.

3. In a conveyer or the like, the combination with a chain having bearing surfaces and lubricant passages leading thereto, of lubricant cups carried by the chain, said cups being in communication with said lubricant passages and each having a toothed screw cap adapted to positively force the lubricant from the cups into the passages with which it communicates, and a relatively stationary contact device arranged adjacent the path of the conveyer in position to engage with and actuate the screw caps of the lubricant cups.

4. In a conveyer or the like, the combination with a chain having bearing surfaces and lubricant passages leading thereto, of lubricant cups carried by the chain, said cups being in communication with said lubricant passages and each having a toothed screw cap adapted to positively force the lubricant from the cups into the passages with which it communicates, and a relatively stationary contact device arranged adjacent the path of the conveyer in position to engage with and actuate the screw caps of the lubricant cups, said contact device being adjustable whereby its engagement with the screw caps can be limited to a given number of passes of the conveyer, substantially as set forth.

5. In a conveyer or the like, the combination with a chain having bearing surfaces and lubricant passages leading thereto, of lubricant cups carried by the chain, said cups being in communication with said lubricant passages and each having a toothed screw cap adapted to positively force the lubricant from the cups into the passages with which it communicates, a relatively stationary contact device arranged adjacent the path of the conveyer in position to engage with and actuate the screw caps of the lubricant cups, and means disposed adjacent the contact device for guiding the conveyer in a definite path as it passes the contact device.

6. In a conveyer or the like, the combination with a chain having bearing surfaces and lubricant passages leading thereto, of lubricant cups carried by the chain, said cups being in communication with said lubricant passages and each having a toothed screw cap adapted to positively force the lubricant from the cups into the passages with which it communicates, a relatively stationary contact device arranged adjacent the path of the conveyer in position to engage with and actuate the screw caps of the lubricant cups, and means disposed adjacent the contact device for guiding the conveyer in a definite path as it passes the contact device, said contact device being adjustable whereby its engagement with the screw caps may be limited to a given number of passes of the conveyer, substantially as set forth.

7. In a conveyer or the like, the combination with a chain comprising links and pivot pins connecting the links, said pins being formed with longitudinal passages and radial passages leading therefrom to the bearing surfaces of the pins, of lubricant cups carried by the chain pins, each cup being in communication with the longitudinal passage of its pin and having a toothed screw cap adapted to positively force the lubricant from the cup into the passages with which it communicates, and a relatively stationary contact device arranged adjacent the path of the conveyer in position to engage with and actuate the screw caps of the lubricant cups.

8. In a conveyer or the like, the combination with a chain comprising links and pivot pins connecting the links, said pins being formed with passages leading from one end to their external bearing surfaces, of lubricant cups carried by the chain pins, each cup being in communication with the passages of its pin and having a toothed screw cap adapted to positively force the lubricant from the cup into the passages with which it communicates, and a relatively stationary contact device arranged adjacent the path of the conveyer in position to engage with and actuate the screw caps of the lubricant cups.

9. In a conveyer or the like, the combination with a chain having bearing surfaces and lubricant passages leading thereto, of lubricant cups carried by the chain, said cups being in communication with said lubricant passages and each having a toothed screw cap adapted to positively force the lubricant from the cups into the passages with which it communicates, a relatively stationary contact device arranged adjacent the path of the conveyer in position to engage with and advance the screw caps of the lubricant cups, and a detent for each lubricant cup adapted to prevent backward movement of its screw cap.

10. In a conveyer or the like, the combination with a chain having bearing surfaces and lubricant passages leading thereto, of lubricant cups carried by the chain, said cups being in communication with said lubricant passages and each having a toothed screw cap adapted to positively force the lubricant from the cups into the passages with which it communicates, a relatively stationary contact device arranged adjacent the path of the conveyer in position to engage with and advance the screw caps of the lubricant cups, and a detent for each lubricant cup adapted to resist rotation of its screw cap.

11. In a conveyer or the like, the combination with a chain, of a series of lubricant receptacles carried by the chain and having discharge passageways leading to the bearing surfaces of the chain, and means operated by the movement of the chain for causing lubricant to be discharged from the receptacles to the bearing surfaces of the chain.

12. In a conveyer or the like, the combination with a chain, of a series of lubricant receptacles carried by the chain and having discharge pasageways leading to the bearing surfaces of the chain, and means operated by the movement of the chain for causing lubricant from the receptacles to be positively forced to the bearing surfaces of the chain.

13. In a conveyer or the like, the combination with a chain, of a series of lubricant receptacles carried by the chain, said receptacles having discharge passageways leading to the bearing surfaces of the chain and being provided with means for forcing lubricant therefrom through said discharge passageways to the bearing surfaces of the chain, and relatively stationary means disposed adjacent the path of the chain and adapted to engage and actuate said forcing means.

14. In a conveyer or the like, the combination with a chain, of a series of lubricant receptacles carried by the chain, said receptacles having discharge passageways leading to the bearing surfaces of the chain and means for forcing lubricant therethrough, and relatively stationary means disposed adjacent the path of the chain for engaging and actuating said forcing means.

In testimony whereof I affix my signature, in presence of two witnesses.

GEORGE HENRY MUELLER.

Witnesses:
E. J. HADDOCK,
CHAS. M. SNIDER.

---

Copies of this patent may be obtained for five cents each, by addressing the "Commissioner of Patents, Washington, D. C."